(12) United States Patent
Ouyang et al.

(10) Patent No.: US 10,693,768 B2
(45) Date of Patent: *Jun. 23, 2020

(54) METHOD, APPARATUS AND SYSTEM FOR CONTROLLING ROUTING INFORMATION ADVERTISING

(71) Applicant: Huawei Technologies Co., Ltd., Shenzhen (CN)

(72) Inventors: Yuanbin Ouyang, Beijing (CN); Shunwan Zhuang, Beijing (CN); Fengqing Yu, Beijing (CN); Tao Bai, Beijing (CN); Lili Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,694

(22) Filed: Dec. 21, 2018

(65) Prior Publication Data

US 2019/0123995 A1 Apr. 25, 2019

Related U.S. Application Data

(63) Continuation of application No. 14/939,971, filed on Nov. 12, 2015, now Pat. No. 10,200,276, which is a
(Continued)

(30) Foreign Application Priority Data

May 15, 2013 (CN) .......................... 2013 1 0180233

(51) Int. Cl.
*H04L 12/741* (2013.01)
*H04L 12/751* (2013.01)
(Continued)

(52) U.S. Cl.
CPC .......... *H04L 45/24* (2013.01); *H04L 12/6418* (2013.01); *H04L 41/0803* (2013.01); *H04L 45/02* (2013.01); *H04L 45/60* (2013.01)

(58) Field of Classification Search
None
See application file for complete search history.

(56) References Cited

U.S. PATENT DOCUMENTS 6,584,093 B1 * 6/2003 Salama ............... H04L 12/2856
370/351
7,626,948 B1 12/2009 Cook et al.
(Continued)

FOREIGN PATENT DOCUMENTS

CN 1697408 A 11/2005
CN 101114971 A 1/2008
(Continued)

OTHER PUBLICATIONS

Lougheed et al., "A Border Gateway Protocol (BGP)," Network Working Group, RFC1105, pp. 1-17 (Jun. 1989).
(Continued)

*Primary Examiner* — Duc T Duong
(74) *Attorney, Agent, or Firm* — Leydig, Voit & Mayer, Ltd.

(57) ABSTRACT

A method, an apparatus and a system for controlling routing information advertising are provided, which relate to the field of communications and are used for reducing the configuration complexity and reinforcing the operability. The method includes: receiving, by a control device, first routing information sent by a first forwarding device; wherein the first routing information includes an identifier of the first forwarding device; determining a first routing path according to the identifier of the first forwarding device, an identifier of a second forwarding device and a routing path group; and determining an advertising range of second
(Continued)

---

101 — A control device receives first routing information sent by a first forwarding device; wherein the first routing information includes an identifier of the first forwarding device 102 — A first routing path is determined according to the identifier of the first forwarding device, an identifier of a second forwarding device and a routing path group 103 — An advertising range of the second routing information for the second forwarding device is determined according to the first routing path; wherein the second routing information is routing information generated by the control device according to the first routing information, the second forwarding device is a receiver of the second routing information advertised by the control device, and the advertising range of the second routing information includes an identifier of the external neighbor of the second forwarding device, for enabling the second forwarding device to advertise the second routing information according to the advertising range of the second routing information routing information for the second forwarding device according to the first routing path; for enabling the second forwarding device to advertise the second routing information according to the advertising range of the second routing information.

18 Claims, 6 Drawing Sheets

Related U.S. Application Data continuation of application No. PCT/CN2014/077110, filed on May 9, 2014.

(51) Int. Cl.
| | |
|---|---|
| *H04L 12/707* | (2013.01) |
| *H04L 12/64* | (2006.01) |
| *H04L 12/24* | (2006.01) |
| *H04L 12/773* | (2013.01) |

(56) References Cited

U.S. PATENT DOCUMENTS

| | | | |
|---|---|---|---|
| 8,606,938 B1 | 12/2013 | Chong et al. | |
| 8,612,576 B1 | 12/2013 | Brandwine et al. | |
| 8,755,389 B1 | 6/2014 | Poutievski et al. | |
| 9,191,318 B1 | 11/2015 | Van De Velde et al. | |
| 10,367,716 B2 * | 7/2019 | Gage | H04W 40/24 |
| 2004/0085961 A1 | 5/2004 | Coffell et al. | |
| 2004/0255028 A1 | 12/2004 | Chu et al. | |
| 2005/0129024 A1 * | 6/2005 | Fisher | H04L 12/5601 |
| | | | 370/395.1 |
| 2005/0152333 A1 | 7/2005 | Smith | |
| 2006/0140136 A1 | 6/2006 | Filsfils et al. | |
| 2006/0153200 A1 | 7/2006 | Filsfils et al. | |
| 2006/0227723 A1 * | 10/2006 | Vasseur | H04L 45/02 |
| | | | 370/254 |
| 2006/0227724 A1 * | 10/2006 | Thubert | H04L 45/48 |
| | | | 370/254 |
| 2006/0233181 A1 | 10/2006 | Raszuk et al. | |
| 2006/0291404 A1 | 12/2006 | Thubert et al. | |
| 2007/0133545 A1 | 6/2007 | Tsuchino et al. | |
| 2007/0183334 A1 * | 8/2007 | White | H04L 45/00 |
| | | | 370/238 |
| 2007/0214275 A1 | 9/2007 | Mirtorabi et al. | |
| 2007/0245034 A1 | 10/2007 | Retana et al. | |
| 2007/0258376 A1 * | 11/2007 | Li | H04L 45/04 |
| | | | 370/238 |
| 2008/0062986 A1 | 3/2008 | Shand et al. | |
| 2008/0212585 A1 * | 9/2008 | White | H04L 45/00 |
| | | | 370/392 |
| 2008/0228940 A1 * | 9/2008 | Thubert | H04L 29/12207 |
| | | | 709/238 |
| 2009/0041019 A1 | 2/2009 | He et al. | |
| 2010/0002712 A1 | 1/2010 | Suzuki et al. | |
| 2010/0142543 A1 * | 6/2010 | Shaikh | H04L 45/04 |
| | | | 370/401 |
| 2010/0220736 A1 | 9/2010 | Mohapatra et al. | |
| 2011/0310812 A1 | 12/2011 | Gage | |
| 2012/0063460 A1 * | 3/2012 | Hallivuori | H04L 45/02 |
| | | | 370/392 |
| 2012/0093154 A1 | 4/2012 | Rosenberg et al. | |
| 2012/0144066 A1 | 6/2012 | Medved et al. | |
| 2012/0213218 A1 | 8/2012 | Yilmaz et al. | |
| 2012/0290716 A1 | 11/2012 | Ogielski et al. | |
| 2013/0077528 A1 | 3/2013 | Visser | |
| 2013/0121339 A1 * | 5/2013 | Dispensa | H04L 12/1868 |
| | | | 370/401 |
| 2013/0132542 A1 | 5/2013 | Zhang et al. | |
| 2013/0343176 A1 | 12/2013 | Bashandy et al. | |
| 2014/0156848 A1 | 6/2014 | Uttaro et al. | |
| 2017/0272356 A1 | 9/2017 | Visser | |

FOREIGN PATENT DOCUMENTS

| | | |
|---|---|---|
| CN | 101442468 A | 5/2009 |
| CN | 102624623 A | 8/2012 |
| WO | 2006017123 A2 | 2/2006 |

OTHER PUBLICATIONS

Lougheed et al., "A Border Gateway Protocol (BGP)," Network Working Group, RFC1163, pp. 1-29 (Jun. 1990).
Lougheed et al., "A Border Gateway Protocol 3 (BGP-3)," Network Working Group, RFC1267, pp. 1-35 (Oct. 1991).
Rekhter, "A Border Gateway Protocol 4 (BGP-4)," Network Working Group, RFC4271, pp. 1-104 (Jan. 2006).
Walton et al., "Advertisement of Multiple Paths in BGP," draft-ietf-idr-add-paths-07, Network Working Group, pp. 1-9 (Jun. 17, 2012).
Bates et al., "BGP Route Reflection: An Alternative to Full Mesh Internal BGP (IBGP)," Network Working Group, RFC4456, pp. 1-12 (Apr. 2006).
Scudder et al., "Capabilities Advertisement with BGP-4," Network Working Group, RFC5492, pp. 1-7 (Feb. 2009).

* cited by examiner

METHOD, APPARATUS AND SYSTEM FOR CONTROLLING ROUTING INFORMATION ADVERTISING

CROSS-REFERENCE TO RELATED APPLICATIONS

This application is a continuation of U.S. patent application Ser. No. 14/939,971, filed on Nov. 12, 2015, which is a continuation of International Patent Application No. PCT/CN2014/077110, filed on May 9, 2014. The International Application claims priority to Chinese Patent Application No. 201310180233.X, filed on May 15, 2013. All of the aforementioned patent applications are hereby incorporated by reference in their entireties.

TECHNICAL FIELD

Embodiments of the present application relate to the field of communications, and particularly, to a method, an apparatus and a system for controlling routing information advertising.

BACKGROUND

An autonomous system (referred to as AS) includes multiple routers (clients) and a reflection router, a router located at the periphery (edge) of the AS may be called an edge router, and the edge router in one AS may exchange routing information with edge routers in other ASs. The relationship between two edge routers which may exchange the routing information and respectively belongs to different ASs may be called an external neighbor relationship.

With the rapid development of network technology and the continuous growth of user needs, cases of mutual access between different ASs are more and more popular. With the service growth, a flow outlet of one AS accessing another AS needs to be dynamically adjusted. With AS1 accessing AS2 as an example, in general, a multi-exist-discriminator (referred to as MED) advertised by the AS2 to the AS1 is dynamically adjusted to enable an edge router of the AS1 to dynamically adjust a routing result, so as to adjust the flow outlet.

Specifically, an interior gateway protocol path weight (IGP Metric) between the routers in the AS2 is set in a reflection router according to an expected flow model, and the IGP is an abbreviation of an interior gateway protocol path weight (Interior Gateway Protocol); when advertising the routing information to other routers in the AS2, the reflection router carries the path weight; an edge router in the AS2 advertises the routing information to the edge router in the AS1 having an external neighbor relationship with the edge router in the AS2; when a certain edge router in the AS1 has an external neighbor relationship with at least two edge routers in the AS2, the edge router uses the path weight as MED and determines the routing result according to the MED, so as to adjust the flow outlet according to the expected flow model.

In the solution of dynamically adjusting the MED advertised by the AS2 to the AS1 to adjust the flow outlet, multiple routers need to cooperatively configure the path weight, so that the configuration is complicated and the user operability is poor.

SUMMARY

Embodiments of the present application provide a method, an apparatus and a system for controlling routing information advertising, which is used for reducing the configuration complexity and reinforcing the operability.

To fulfill the above-mentioned objectives, the embodiments of the present application adopt the following technical solutions:

In a first aspect, a method for controlling routing information advertising is provided, comprising:

receiving, by a control device, first routing information sent by a first forwarding device, wherein the first routing information comprises an identifier of the first forwarding device;

determining a first routing path according to the identifier of the first forwarding device, an identifier of a second forwarding device and a routing path group; and determining an advertising range of second routing information for the second forwarding device according to the first routing path; wherein the second routing information is routing information generated by the control device according to the first routing information, the second forwarding device is a receiver of the second routing information advertised by the control device, and the advertising range of the second routing information comprises an identifier of an external neighbor of the second forwarding device, for enabling the second forwarding device to advertise the second routing information according to the advertising range of the second routing information.

In combination with the first aspect, in a first possible implementation manner, the determining an advertising range of second routing information for the second forwarding device according to the first routing path, comprises:

taking the identifier of the external neighbor of the second forwarding device comprised in the first routing path as the advertising range of the second routing information for the second forwarding device.

In combination with the first aspect or the first possible implementation manner of the first aspect, in a second possible implementation manner, determining a first routing path according to the identifier of the first forwarding device, an identifier of a second forwarding device and a routing path group, comprises:

selecting a routing path comprising the identifier of the first forwarding device and the identifier of the second forwarding device from the routing path group to serve as the first routing path.

In combination with the first aspect, in a third possible implementation manner, before the determining a first routing path according to the identifier of the first forwarding device, an identifier of a second forwarding device and a routing path group, the method further comprises:

obtaining an internal network topology and an external network topology for the second forwarding device within a preset range;

generating the internal network topology and the external network topology for the second forwarding device into a whole network topology for the second forwarding device;

determining the routing path group according to the whole network topology for the second forwarding device.

In combination with the third possible implementation manner of the first aspect, in a fourth possible implementation manner, the obtaining an external network topology for the second forwarding device within a preset range, comprises:

obtaining the external network topology for the second forwarding device stored by itself;

or, receiving the external network topology for the second forwarding device sent by the second forwarding device.

In combination with the fourth possible implementation manner of the first aspect, in a fifth possible implementation manner, the obtaining the external network topology for the second forwarding device stored by itself, comprises:

obtaining the external network topology for the second forwarding device stored by itself through a graphic user interface GUI or a command line.

In a second aspect, a method for controlling routing information advertising is provided, comprising:

receiving, by a second forwarding device, second routing information sent by a control device; wherein the second routing information comprises an advertising range of the second routing information, and the advertising range of the second routing information comprises an identifier of an external neighbor of the second forwarding device; and controlling the advertising of the second routing information according to the advertising range of the second routing information.

In combination with the second aspect, in a first possible implementation manner, the controlling the advertising of the second routing information according to the advertising range of the second routing information, comprises:

advertising the second routing information to the external neighbor of the second forwarding device corresponding to the advertising range of the second routing information.

In combination with the second aspect or the first possible implementation manner of the second aspect, in a second possible implementation manner, before the receiving, by a second forwarding device, second routing information sent by a control device, the method further comprises:

sending a network topology for the second forwarding device to the control device, for enabling the control device to generate the second routing information at least according to first routing information sent by a first forwarding device and the network topology for the second forwarding device.

In a third aspect, an apparatus for controlling routing information advertising is provided, comprising:

a receiving unit, configured to receive first routing information sent by a first forwarding device, wherein the first routing information comprises an identifier of the first forwarding device;

a routing path determining unit, configured to determine a first routing path according to the identifier of the first forwarding device transmitted by the receiving unit, an identifier of a second forwarding device and a routing path group; and an advertising range determining unit, configured to determine an advertising range of second routing information for the second forwarding device according to the first routing path transmitted by the routing path determining unit; wherein the second routing information is routing information generated by the apparatus according to the first routing information, the second forwarding device is a receiver of the second routing information advertised by the apparatus, and the advertising range of the second routing information comprises an identifier of an external neighbor of the second forwarding device; for enabling the second forwarding device to advertise the second routing information according to the advertising range of the second routing information.

In combination with the third aspect, in a first possible implementation manner, the advertising range determining unit is specifically configured to take the identifier of the external neighbor of the second forwarding device comprised in the first routing path as the advertising range of second routing information for the second forwarding device.

In combination with the third aspect or the first possible implementation manner of the third aspect, in a second possible implementation manner, the routing path determining unit is specifically configured to select a routing path comprising the identifier of the first forwarding device and the identifier of the second forwarding device from the routing path group to serve as the first routing path.

In combination with the third aspect, in a third possible implementation manner, the apparatus further comprising:

a network topology obtaining unit, configured to obtain an internal network topology and an external network topology for the second forwarding device within a preset range; and generate the internal network topology and the external network topology for the second forwarding device into a whole network topology for the second forwarding device;

a routing path group determining unit, configured to determine the routing path group according to the whole network topology for the second forwarding device.

In combination with the third possible implementation manner of the third aspect, in a fourth possible implementation manner, the network topology obtaining unit is specifically configured to, obtain the external network topology for the second forwarding device stored by itself;

or, receive the external network topology for the second forwarding device sent by the second forwarding device.

In combination with the fourth possible implementation manner of the third aspect, in a fifth possible implementation manner, the network topology obtaining unit is specifically configured to obtain the external network topology for the apparatus stored by itself through a graphic user interface GUI or a command line.

In a fourth aspect, an apparatus for controlling routing information advertising is provided, comprising:

a receiving unit, configured to receive second routing information sent by a control device; wherein the second routing information comprises an advertising range of the second routing information; and the advertising range of the second routing information comprises an identifier of an external neighbor of the apparatus; and a controlling unit, configured to control the advertising of the second routing information according to the advertising range of the second routing information transmitted by the receiving unit.

In combination with the fourth aspect, in a first possible implementation manner, the controlling unit is specifically configured to advertise the second routing information to the external neighbor of the apparatus corresponding to the advertising range of the second routing information.

In combination with the fourth aspect or the first possible implementation manner of the fourth aspect, in a second possible implementation manner, the apparatus further comprising:

a sending unit, configured to send a network topology for the apparatus to the control device, for enabling the control device to generate the second routing information at least according to first routing information sent by a first forwarding device and the network topology for the apparatus.

In a fifth aspect, a system for controlling routing information advertising is provided, including the apparatus for advertising routing information as shown in the above-mentioned third aspect and/or the apparatus for advertising routing information as shown in the above-mentioned fourth aspect.

According to the method, the apparatus and the system for controlling routing information advertising provided by embodiments of the present application, a control device determines a first routing path through an identifier of a first forwarding device (an identifier of a sender of the routing information) and an identifier of a second forwarding device (an identifier of a receiver of the routing information), and determines an advertising range of the routing information for the second forwarding device according to the first routing path, and the second forwarding device advertises the routing information according to the advertising range of the routing information, such that advertising the routing information by the second forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

DESCRIPTION OF EMBODIMENTS

An exemplary description of a method, an apparatus and a system for controlling routing advertising provided by embodiments of the present application will be given below in combination with the accompanying drawings.

Figure 1:
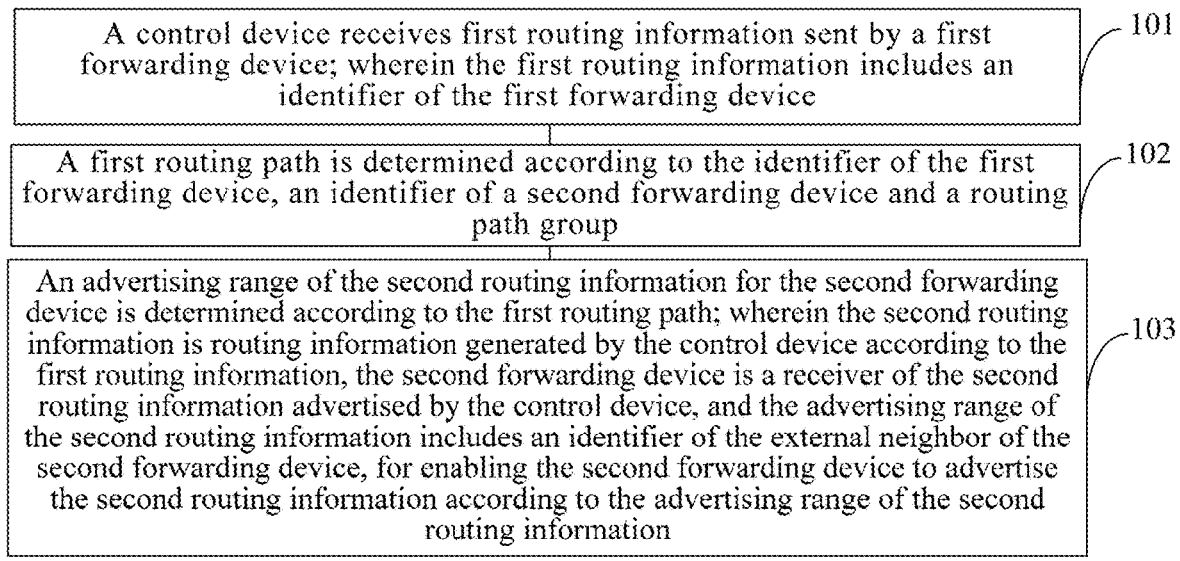
FIG. 1 is a schematic diagram of a flow of a method for controlling routing advertising provided by an embodiment of the present application.

Referring to FIG. 1, it is a method for controlling routing advertising provided by an embodiment of the present application, including:

101: A control device receives first routing information sent by a first forwarding device; wherein the first routing information includes an identifier of the first forwarding device;

exemplarily, the method for controlling routing advertising provided by the embodiment of the present application may be applied to an AS, and in the AS, routing information may be exchanged via a border gateway protocol (referred to as BGP). One AS may include one or multiple reflection routers and a plurality of routers (clients), the reflection router and the router in the AS may exchange the routing information via an internal BGP (referred to as IBGP), and the connection relationship thereof is called IBGP connection; the router located at the periphery (edge) of the AS may be called an edge router, the edge routers respectively belonging to different ASs may exchange the routing information via an external BGP (referred to as EBGP), and the connection relationship thereof is called EBGP connection.

The control device may be a reflection router in the AS, and may also be another device with the function of the reflection router; the first forwarding device may be an edge router in the AS to which the control device belongs;

102: A first routing path is determined according to the identifier of the first forwarding device, an identifier of a second forwarding device and a routing path group;

exemplarily, since the flow direction is opposite to the routing direction, a path in an opposite direction of a flow path may be called a routing path. The routing path group may include multiple routing paths, the routing path is composed of identifiers of multiple nodes within a preset range, and the preset range may be preset in the control device.

Optionally, step 102 may include: selecting a routing path containing the identifier of the first forwarding device and the identifier of the second forwarding device from the routing path group to serve as the first routing path.

Exemplarily, the routing path between two arbitrary nodes is obtained according to a network topology and a preset rule, wherein the preset rule includes: the identifier of any other node excluding end nodes only belongs to one routing path, or the like, where the end nodes refer to nodes at both ends of one routing path.

According to the above-mentioned preset rule, one routing path may be matched in the routing path group by determining the identifiers of two nodes, namely, one routing path may be matched by selecting the identifier of the first forwarding device and the identifier of the second forwarding device, and the routing path is taken as the first routing path.

Further optionally, the determining the routing path group according to a network topology within a preset range may further include: determining the routing path group according to the network topology within the preset range and a constraint condition, wherein the constraint condition includes path length constraint or bandwidth constraint.

Exemplarily, in the network topology, multiple routing paths may exist between any two nodes, so that when determining the routing path between two nodes according to the network topology, some constraint conditions may be added to obtain a routing path expected by the user. Optionally, the constraint conditions may include path length constraint or bandwidth constraint, etc. For example, the routing path with the shortest path between the two nodes may be obtained in the network topology according to the path length constraint, or the routing path with the highest bandwidth between the two nodes is obtained in the network topology according to the bandwidth constraint.

Multiple routing paths obtained in the network topology within the preset range according to the constraint condition form the routing path group. In this case, the first routing path matched in the routing path group is the routing path between two certain nodes expected by the user.

Further, prior to step 102, the method may further include:

1) obtaining an internal network topology and an external network topology for the second forwarding device within a preset range;

2) generating the internal network topology and the external network topology for the second forwarding device into a whole network topology for the second forwarding device; and 3) determining the routing path group according to the whole network topology for the second forwarding device.

Exemplarily, the external network topology for the second forwarding device refers to the network topology formed by the second forwarding device and an external neighbor of the second forwarding device, where the external neighbor of the second forwarding device is the device having an external neighbor relationship with the second forwarding device.

In an embodiment of the present application, the method for obtaining the internal network topology and the external network topology for the second forwarding device within the preset range is not limited, for example, the internal network topology may be gathered via an interior gateway protocol (referred to as IGP), and the external network topology for the second forwarding device may be collectively generated by user configuration and BGP routing, etc.

Optionally, the external network topology for the second forwarding device stored by itself is obtained; specifically, the external network topology for the second forwarding device stored by itself is obtained in such manners as a graphic user interface (referred to as GUI) or a command line, etc.

Optionally, the external network topology for the second forwarding device sent by the second forwarding device is received.

103: An advertising range of the second routing information for the second forwarding device is determined according to the first routing path; wherein the second routing information is routing information generated by the control device according to the first routing information, the second forwarding device is a receiver of the second routing information advertised by the control device, and the advertising range of the second routing information includes an identifier of the external neighbor of the second forwarding device, for enabling the second forwarding device to advertise the second routing information according to the advertising range of the second routing information.

Exemplarily, after receiving the first routing information sent by the first forwarding device, the control device generates the first routing information into the second routing information and advertises the second routing information to other forwarding device in the AS to which the control device belongs. The second forwarding device may be an edge forwarding device (an edge router) excluding the first forwarding device in the AS to which the control device belongs.

The generating the first routing information into the second routing information may include changing the next hop and the like, and in an embodiment of the present application, the second routing information may further carry the advertising range of the second routing information for the second forwarding device. Wherein, the advertising range of the second routing information for the second forwarding device is used for indicating the second forwarding device to advertise the second routing information to an external neighbor corresponding to the advertising range.

Optionally, step 103 may include: taking the identifier of the external neighbor of the second forwarding device contained in the first routing path as the advertising range of the second routing information for the second forwarding device.

Exemplarily, the second forwarding device may have more than one external neighbor, and the identifier of the external neighbor in the advertising range of the second routing information for the second forwarding device is the identifier of the external neighbor of the second forwarding device contained in the first routing path. Specific reference may be made to the following embodiment.

According to the method for controlling routing information advertising provided by an embodiment of the present application, a control device determines a first routing path through an identifier of a first forwarding device (an identifier of a sender of the routing information) and an identifier of a second forwarding device (an identifier of a receiver of the routing information), and determines the advertising range of the routing information for the second forwarding device according to the first routing path, for enabling the second forwarding device to advertise the routing information according to the advertising range of the routing information, such that advertising the routing information by the second forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

Figure 2:
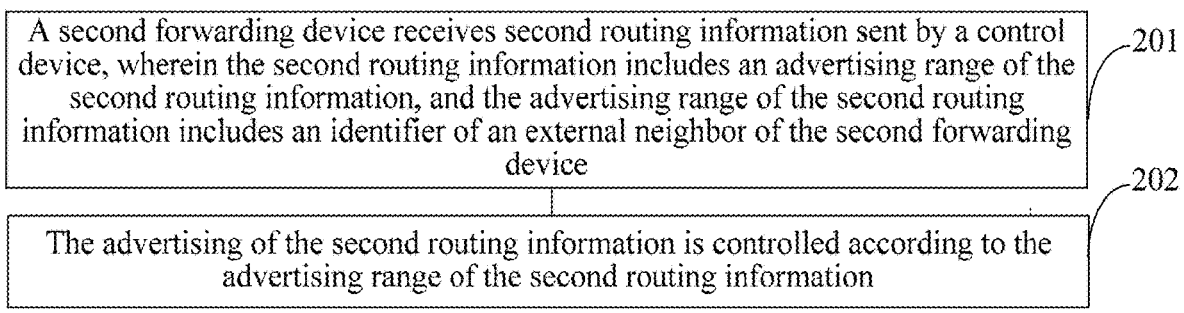
FIG. 2 is a schematic diagram of a flow of another method for controlling routing advertising provided by an embodiment of the present application.

Referring to FIG. 2, it is a method for controlling routing information advertising provided by an embodiment of the present application, including:

201: A second forwarding device receives second routing information sent by a control device, wherein the second routing information includes an advertising range of the second routing information, and the advertising range of the second routing information includes an identifier of an external neighbor of the second forwarding device;

Further, prior to step 201, the method may further include:

sending a network topology for the second forwarding device to the control device, for enabling the control device to generate the second routing information at least according to first routing information sent by a first forwarding device and the network topology for the second forwarding device.

Exemplarily, the control device generates the second routing information according to the network topology for the second forwarding device and the first routing information, specifically, the control device receives the first routing information sent by the first forwarding device, changes a next hop in the first routing information and the like, and adds the advertising range to generate the second routing information. Wherein, the first forwarding device may be the same as the first forwarding device in the above-mentioned embodiment. For the method of the control device for determining the advertising range of the second routing information, the above-mentioned embodiment may be referred, and it will not be repeated redundantly herein.

202: The advertising of the second routing information is controlled according to the advertising range of the second routing information.

Further, step 202 may include: advertising the second routing information to an external neighbor of the second forwarding device corresponding to the advertising range of the second routing information.

Exemplarily, identifiers of multiple external neighbors of the second forwarding device may be stored in the second forwarding device, for example, an external neighbor 1, an external neighbor 2 and an external neighbor 3, the second routing information may be advertised by judging whether the identifier of a certain external neighbor is within the advertising range of the second routing information, specifically, when the identifier of a certain external neighbor is contained in the advertising range of the second routing information, the second routing information is advertised to the external neighbor, and on the contrary, the second routing information is not advertised to the external neighbor, in order to control the routing information advertising of the second forwarding device from the control device side.

According to the method for controlling routing information advertising provided by an embodiment of the present application, a forwarding device receives routing information containing an advertising range sent by a control device, and advertises the routing information according to the advertising range, so that advertising the routing information by the forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

Figure 3:
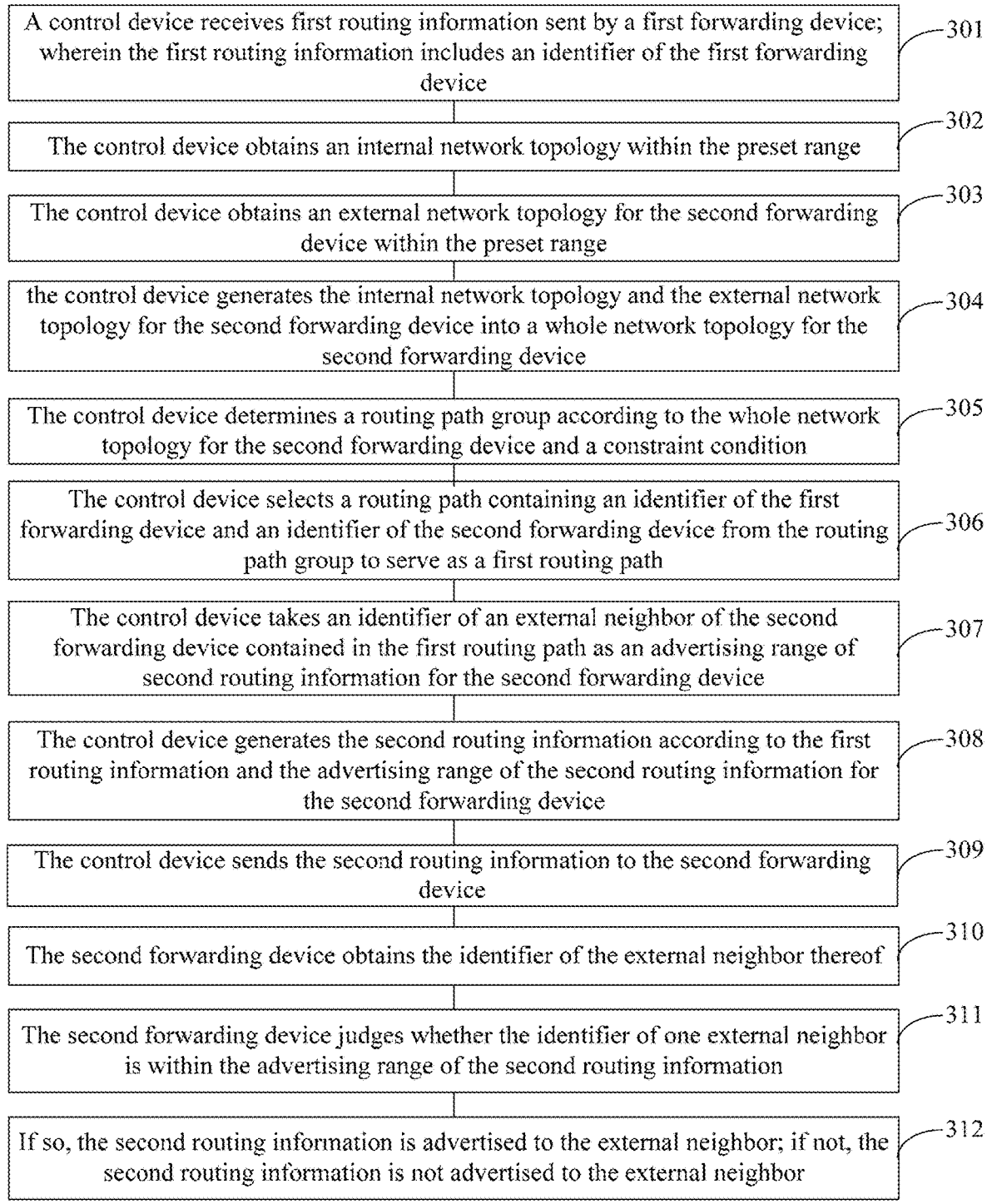
FIG. 3 is a schematic diagram of a flow of another method for controlling routing advertising provided by an embodiment of the present application.

Referring to FIG. 3, it is a method for controlling routing advertising provided by an embodiment of the present application, including:

301: A control device receives first routing information sent by a first forwarding device; wherein the first routing information includes an identifier of the first forwarding device;

exemplarily, an illustration is given in which the control device is a reflection router.

Figure 4:
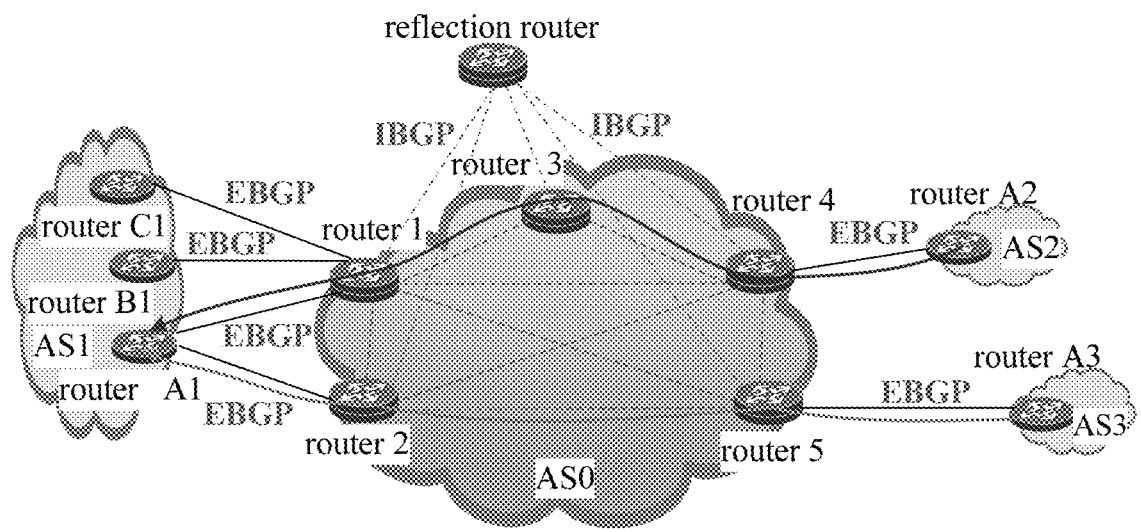
FIG. 4 is a schematic diagram of an AS architecture provided by an embodiment of the present application.

Referring to FIG. 4, a preset range includes: AS0, AS1, AS2, AS3, the identifier of the AS to which the reflection router belongs is the AS0, the AS0 includes the reflection router, a router 1, a router 2, ..., a router 5, and the router 1, the router 2, ..., the router 5 are all edge routers; the edge devices of the AS1 are a router A1, a router B1 and a router C1; the edge device of the AS2 is a router A2; the edge device of the AS3 is a router A3.

Assuming that the first forwarding device is a router 4.

302: The control device obtains an internal network topology within the preset range;

exemplarily, the control device may gather the internal network topology via IGP.

Referring to FIG. 4, the internal network topology of the AS0 is 5 nodes and a connection relationship thereof, specifically, are the router 1, the router 2, ..., the router 5, and for the connection relationship of the five nodes may be referred to dotted line parts in FIG. 4.

303: The control device obtains an external network topology for the second forwarding device within the preset range;

exemplarily, the control device may collectively generate the external network topology via user configuration and BGP routing; or obtain the external network topology for the second forwarding device stored by itself in such manners as a GUI, a command line and the like; or receive the external network topology for the second forwarding device sent by the second forwarding device, etc.

Referring to FIG. 4, assuming that the second forwarding device is the router 1, and the network neighbors of the router 1 within the preset range are the router A1, the router B1 and the router C1, then the external network topology for the second forwarding device is: the router 1, the router A1, the router B1, the router C1 and the connection relationship of the router 1 with the router A1, the router B1 and the router C1.

304: the control device generates the internal network topology and the external network topology for the second forwarding device into a whole network topology for the second forwarding device;

exemplarily, the whole network topology for the second forwarding device is: the router 1, the router 2, ..., the router 5, and the connection relationship thereof; the router 1, the router A1, the router B1, the router C1 and the connection relationship of the router 1 with the router A1, the router B1 and the router C1.

305: The control device determines a routing path group according to the whole network topology for the second forwarding device and a constraint condition;

exemplarily, the constraint condition may be path length constraint or bandwidth constraint, etc.

Referring to FIG. 4, the determined routing path group includes:

a routing path 1: router A1-router 1-router 3-router 4-AS2;

a routing path 2: router A1-router 2-router 5-AS3.

306: The control device selects a routing path containing an identifier of the first forwarding device and an identifier of the second forwarding device from the routing path group to serve as a first routing path;

exemplarily, the first routing path may be determined as the routing path 1 according to the identifier of the first forwarding device (the router 4) and the identifier of the second forwarding device (the router 1).

307: The control device takes an identifier of an external neighbor of the second forwarding device contained in the first routing path as an advertising range of second routing information for the second forwarding device;

exemplarily, the identifier (A1) of the external neighbor of the second forwarding device contained in the first routing path (the routing path 1) is taken as the advertising range of the second routing information for the second forwarding device.

308: The control device generates the second routing information according to the first routing information and the advertising range of the second routing information for the second forwarding device;

exemplarily, the control device changes a next hop and the like of the first routing information to generate the second routing information, and the second routing information carries the advertising range of the second routing information.

309: The control device sends the second routing information to the second forwarding device;

310: The second forwarding device obtains the identifier of the external neighbor thereof;

exemplarily, the identifier of the external neighbor of the second forwarding device includes: the router A1, the router B1 and the router C1.

311: The second forwarding device judges whether the identifier of one external neighbor is within the advertising range of the second routing information;

exemplarily, the second forwarding device (the router 1) may respectively judge whether the router A1, the router B1 and the router C1 are within the advertising range of the second routing information. The judging result is as follows: the router A1 is within the advertising range of the second routing information; the router B1 and the router C1 are not within the advertising range of the second routing information.

312: If so, the second routing information is advertised to the external neighbor; if not, the second routing information is not advertised to the external neighbor.

Exemplarily, the router 1 advertises the second routing information to the router A1 and does not advertise the second routing information to the router B1 and the router C1.

According to the method for controlling routing information advertising provided by an embodiment of the present application, a control device determines a first routing path through an identifier of a first forwarding device (an identifier of a sender of the routing information) and an identifier of a second forwarding device (an identifier of a receiver of the routing information), and determines an advertising range of the routing information for the second forwarding device according to the first routing path, and the second forwarding device advertises the routing information according to the advertising range of the routing information, such that advertising the routing information by the second forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

Figure 5:
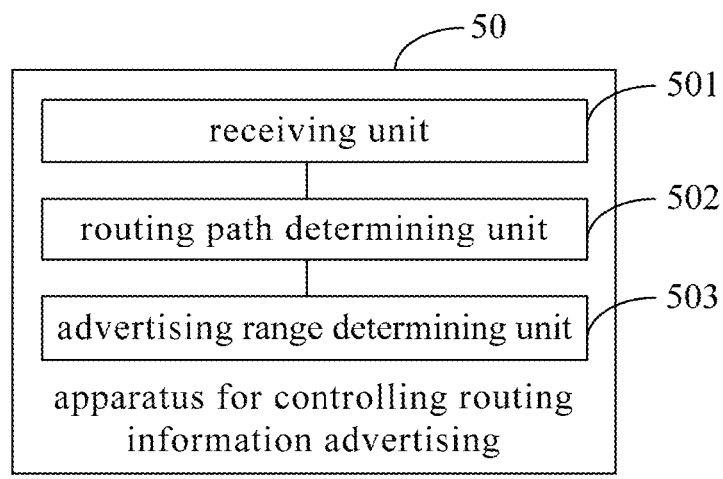
FIG. 5 is a schematic diagram of a structure of an apparatus for controlling routing advertising provided by an embodiment of the present application.

On one hand, referring to FIG. 5, it is an apparatus 50 for controlling routing information advertising provided by an embodiment of the present application, used for implementing the method for controlling routing information advertising as shown in FIG. 1, including:

a receiving unit 501, configured to receive first routing information sent by a first forwarding device; wherein the first routing information includes an identifier of the first forwarding device;

a routing path determining unit 502, configured to determine a first routing path according to the identifier of the first forwarding device transmitted by the receiving unit 501, an identifier of a second forwarding device and a routing path group; and an advertising range determining unit 503, configured to determine an advertising range of second routing information for the second forwarding device according to the first routing path transmitted by the routing path determining unit 502, wherein the second routing information is routing information generated by the apparatus 50 according to the first routing information, the second forwarding device is a receiver of the second routing information advertised by the apparatus 50, and the advertising range of the second routing information includes an identifier of an external neighbor of the second forwarding device, for enabling the second forwarding device to advertise the second routing information according to the advertising range of the second routing information.

Further, the advertising range determining unit 503 may be specifically configured to take the identifier of the external neighbor of the second forwarding device contained in the first routing path as the advertising range of the second routing information for the second forwarding device.

Further, the routing path determining unit 502 may be specifically configured to select a routing path containing the identifier of the first forwarding device and the identifier of the second forwarding device from the routing path group to serve as the first routing path.

Figure 6:
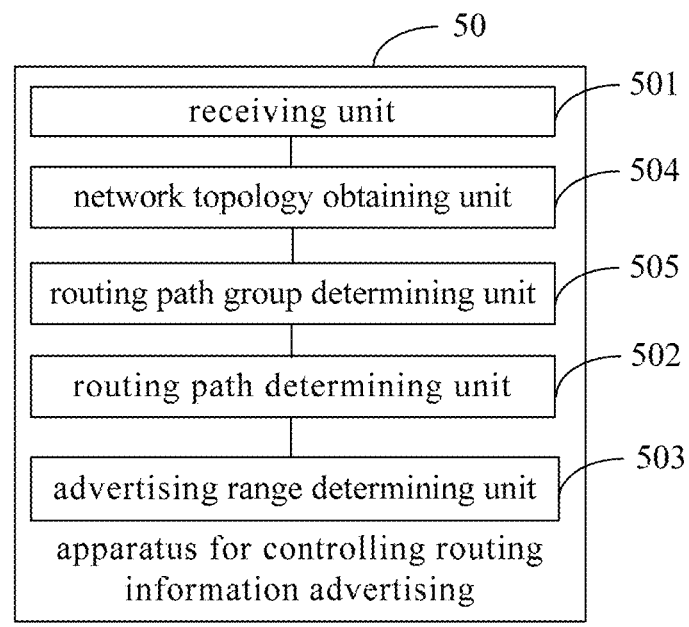
FIG. 6 is a schematic diagram of a structure of another apparatus for controlling routing advertising provided by an embodiment of the present application.

Further, referring to FIG. 6, the apparatus 50 may further include:

a network topology obtaining unit 504, configured to obtain an internal network topology and an external network topology for the second forwarding device within a preset range, and generate the internal network topology and the external network topology for the second forwarding device into a whole network topology for the second forwarding device;

a routing path group determining unit 505, configured to determine the routing path group according to the whole network topology for the second forwarding device.

Optionally, the network topology obtaining unit 504 may be specifically configured to, obtain the external network topology for the second forwarding device stored by itself;

or, receive the external network topology for the second forwarding device sent by the second forwarding device.

Optionally, the network topology obtaining unit 504 may be specifically configured to obtain the external network topology for the apparatus stored by itself through a graphic user interface GUI or a command line.

Exemplarily, the apparatus 50 may be the control device in the above-mentioned method embodiment.

According to the apparatus for controlling routing information advertising provided by an embodiment of the present application, a first routing path is determined through an identifier of a first forwarding device (an identifier of a sender of the routing information) and an identifier of a second forwarding device (an identifier of a receiver of the routing information), and an advertising range of the routing information for the second forwarding device is determined according to the first routing path, for enabling the second forwarding device to advertise the routing information according to the advertising range of the routing information, so that advertising the routing information by the second forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

Figure 7:
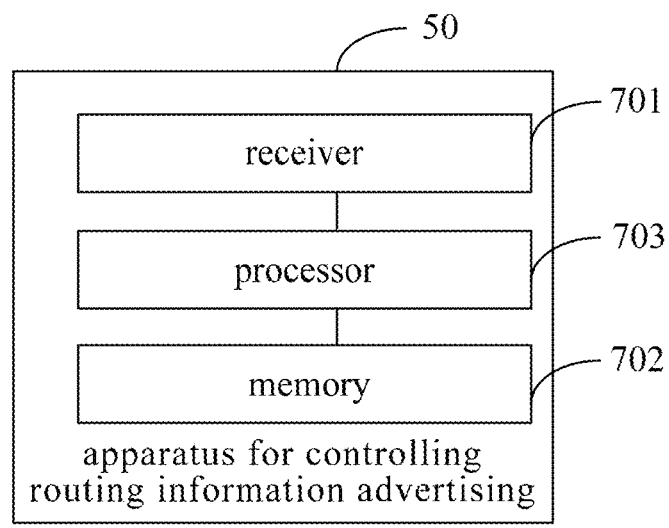
FIG. 7 is a schematic diagram of a structure of another apparatus for controlling routing advertising provided by an embodiment of the present application.

On one hand, referring to FIG. 7, it is an apparatus 50 for controlling routing information advertising provided by an embodiment of the present application, used for implementing the method for controlling routing information advertising as shown in FIG. 1, including: a receiver 701, a memory 702 and a processor 703 connected with the receiver 701 and the memory 702 respectively, wherein, the receiver 701 is configured to receive first routing information sent by a first forwarding device, wherein the first routing information includes an identifier of the first forwarding device;

the memory 702 is configured to store a group of codes, wherein the codes are used for controlling the processor 703 to implement the following actions:

determining a first routing path according to the identifier of the first forwarding device, an identifier of a second forwarding device and a routing path group; and determining an advertising range of second routing information for the second forwarding device according to the first routing path, wherein the second routing information is routing information generated by the control device according to the first routing information, the second forwarding device is a receiver of the second routing information advertised by the control device, and the advertising range of the second routing information includes an identifier of an external neighbor of the second forwarding device, for enabling the second forwarding device to advertise the second routing information according to the advertising range of the second routing information.

Further, the processor 703 may be specifically configured to take the identifier of the external neighbor of the second forwarding device contained in the first routing path as the advertising range of the second routing information for the second forwarding device.

Further, the processor 703 may be specifically configured to select a routing path containing the identifier of the first forwarding device and the identifier of the second forwarding device from the routing path group to serve as the first routing path.

Further, the processor 703 may be further configured to obtain an internal network topology and an external network topology for the second forwarding device within a preset range;

generate the internal network topology and the external network topology for the second forwarding device into a whole network topology for the second forwarding device; and determine the routing path group according to the whole network topology for the second forwarding device.

Optionally, the processor 703 may be specifically configured to obtain the external network topology for the second forwarding device stored by itself;

or, receive the external network topology for the second forwarding device sent by the second forwarding device.

Optionally, the processor 703 may be specifically configured to obtain the external network topology for the second forwarding device stored by itself through a graphic user interface GUI or a command line.

Exemplarily, the apparatus 50 may be the control device in the above-mentioned method embodiment.

According to the apparatus for controlling routing information advertising provided by an embodiment of the present application, a first routing path is determined through an identifier of a first forwarding device (an identifier of a sender of the routing information) and an identifier of a second forwarding device (an identifier of a receiver of the routing information), and an advertising range of the routing information for the second forwarding device is determined according to the first routing path, for enabling the second forwarding device to advertise the routing information according to the advertising range of the routing information, so that advertising the routing information by the second forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

Figure 8:
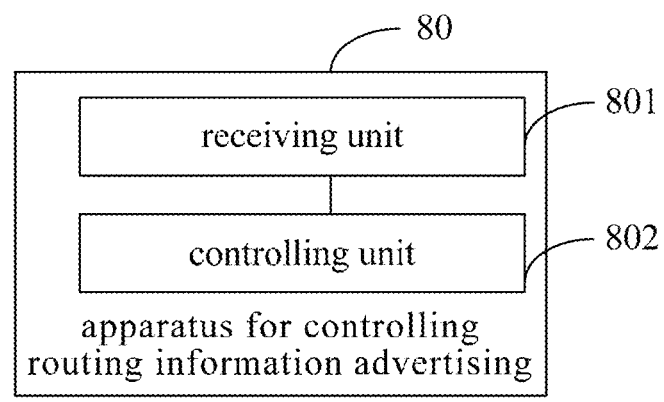
FIG. 8 is a schematic diagram of a structure of another apparatus for controlling routing advertising provided by an embodiment of the present application.

On one hand, referring to FIG. 8, it is an apparatus 80 for controlling routing information advertising provided by an embodiment of the present application, used for implementing the method for controlling routing information advertising as shown in FIG. 2, including:

a receiving unit 801, configured to receive second routing information sent by a control device, wherein the second routing information includes an advertising range of the second routing information, and the advertising range of the second routing information includes an identifier of an external neighbor of the apparatus; and a controlling unit 802, configured to control the advertising of the second routing information according to the advertising range of the second routing information transmitted by the receiving unit 801.

Further, the controlling unit 802 may be specifically configured to advertise the second routing information to the external neighbor of the apparatus corresponding to the advertising range of the second routing information.

Figure 9:
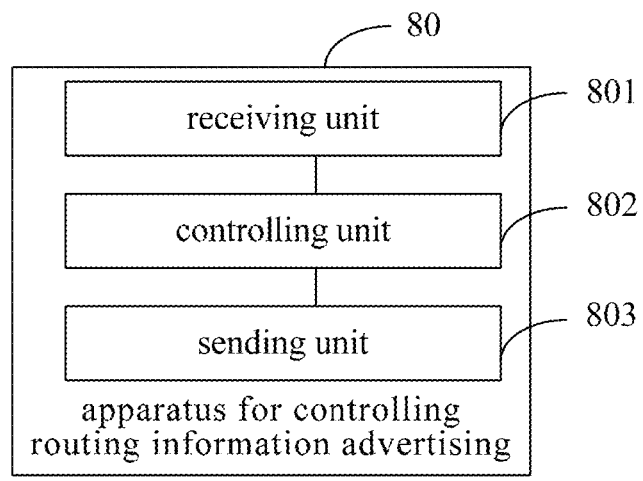
FIG. 9 is a schematic diagram of a structure of another apparatus for controlling routing advertising provided by an embodiment of the present application.

Further, referring to FIG. 9, the apparatus 80 may further include:

a sending unit 803, configured to send a network topology for the apparatus to the control device, for enabling the control device to generate the second routing information at least according to first routing information sent by a first forwarding device and the network topology for the apparatus.

Exemplarily, the apparatus 80 may be the second forwarding device in the above-mentioned method embodiment.

According to the apparatus for controlling routing information advertising provided by an embodiment of the present application, by receiving routing information containing an advertising range sent by a control device and by advertising the routing information according to the advertising range, so that advertising the routing information by a forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

Figure 10:
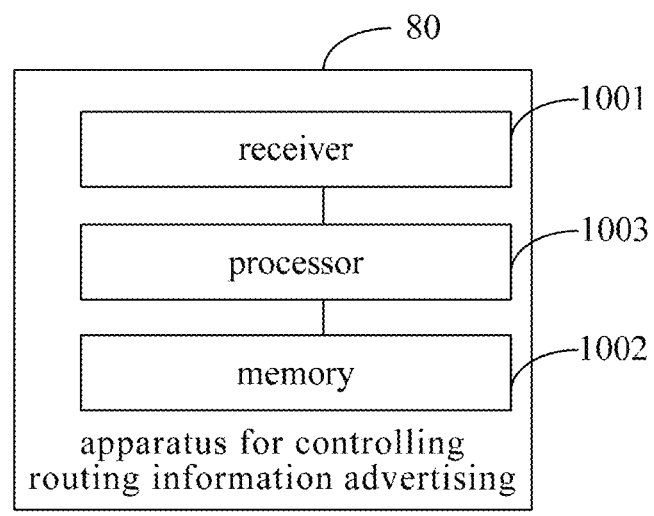
FIG. 10 is a schematic diagram of a structure of another apparatus for controlling routing advertising provided by an embodiment of the present application.

On one hand, referring to FIG. 10, it is an apparatus 80 for controlling routing information advertising provided by an embodiment of the present application, used for implementing the method for controlling routing information advertising as shown in FIG. 2, including: a receiver 1001, a memory 1002 and a processor 1003 connected with the receiver 1001 and the memory 1002 respectively, wherein, the receiver 1001 is configured to receive second routing information sent by a control device, wherein the second routing information includes an advertising range of the second routing information, and the advertising range of the second routing information includes an identifier of an external neighbor of the apparatus 80; and is configured to control the advertising of the second routing information according to the advertising range of the second routing information.

the memory 1002 is configured to store a group of codes, wherein the codes are used for controlling the processor 1003 to implement the following actions:

advertising the second routing information to the external neighbor of the apparatus corresponding to the advertising range of the second routing information.

Figure 11:
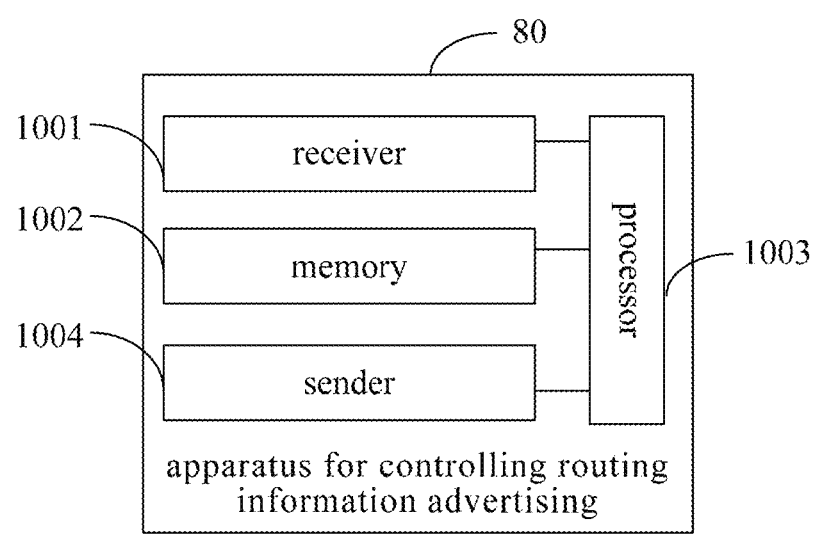
FIG. 11 is a schematic diagram of a structure of another apparatus for controlling routing advertising provided by an embodiment of the present application.

Further, referring to FIG. 11, the apparatus 80 may further include a sender 1004, configured to send a network topology for the apparatus 80 to the control device, for enabling the control device to generate the second routing information at least according to first routing information sent by a first forwarding device and the network topology for the apparatus.

Exemplarily, the apparatus 80 may be the second forwarding device in the above-mentioned method embodiment.

According to the apparatus for controlling routing information advertising provided by an embodiment of the present application, by receiving routing information containing an advertising range sent by a control device and by advertising the routing information according to the advertising range, so that advertising the routing information by a forwarding device is centrally controlled at the control device side, the configuration complexity is reduced and the operability is reinforced. The problems of complicated configuration and poor user operability caused by the fact that multiple routers are required to cooperatively configure the path weight in the prior art are solved.

In addition, an embodiment of the present application further provides a system for controlling routing information advertising, including any one of the above-mentioned apparatus 50 for controlling routing information advertising and/or any one of the above-mentioned apparatus 80 for controlling routing information advertising.

The foregoing descriptions are merely specific embodiments of the present application, rather than limiting the protection scope of the present application. Any skilled one who is familiar with this art could readily think of variations or substitutions within the disclosed technical scope of the present application, and these variations or substitutions shall fall within the protection scope of the present application. Accordingly, the protection scope of the claims should prevail over the protection scope of the present application.

What is claimed is:

1. An apparatus comprising:
a non-transitory memory storing instructions; and
a processor communicably coupled to the non-transitory memory; wherein the instructions, when executed by the processor, cause the apparatus to perform:
receiving first routing information, wherein the first routing information comprises an identifier of a first forwarding device;
determining a first routing path according to the identifier of the first forwarding device and an identifier of a second forwarding device; and
determining an advertising range of second routing information for the second forwarding device according to the first routing path;
sending the second routing information to the second forwarding device;
wherein the second routing information is generated according to the first routing information, the second forwarding device receives the second routing information, and the advertising range of the second routing information comprises an identifier of an external neighbor of the second forwarding device and the advertising range of the second routing information is used to enable the second forwarding device to advertise the second routing information according to the advertising range of the second routing information.

2. The apparatus according to claim 1, wherein the advertising range of the second routing information for the second forwarding device comprises the identifier of the external neighbor of the second forwarding device.

3. The apparatus according to claim 1, wherein the first routing path comprises the identifier of the first forwarding device and the identifier of the second forwarding device.

4. The apparatus according to claim 3, wherein the first routing path comprises a shortest path, wherein the shortest path between the identifier of the first forwarding device and the identifier of the second forwarding device is obtained according to path length constraint.

5. The apparatus according to claim 3, wherein the first routing path comprises a highest bandwidth path, wherein the highest bandwidth path between the identifier of the first forwarding device and the identifier of the second forwarding device is obtained according to bandwidth constraint.

6. The apparatus according to claim 1, wherein the instructions, when executed by the processor, further cause the apparatus to perform:
obtaining an internal network topology and an external network topology for the second forwarding device within a preset range; and
generating a whole network topology for the second forwarding device according to the internal network topology and the external network topology for the second forwarding device.

7. The apparatus according to claim 6, wherein the instructions, when executed by the processor, further cause the apparatus to perform:
receiving the external network topology for the second forwarding device from the second forwarding device.

8. The apparatus according to claim 6, wherein the instructions, when executed by the processor, further cause the apparatus to perform:
obtaining the external network topology for the second forwarding device from the apparatus through one of:
a graphic user interface (GUI) or a command line by receiving user input.

9. An apparatus comprising:
a non-transitory memory storing instructions; and
a processor communicably coupled to the non-transitory memory; wherein the instructions, when executed by the processor, cause the apparatus to perform:
sending a network topology for the apparatus to a control device, for enabling the control device to generate second routing information and an advertising range of the second routing information, wherein
a) the second routing information is routing information generated according to first routing information from a first forwarding device, and
b) the advertising range of the second routing information is an advertising range generated according to a first routing path of the network topology, and comprises an identifier of the first forwarding device and an identifier of the apparatus;
receiving the second routing information from the control device, wherein
a) the second routing information comprises the advertising range of the second routing information, and
b) the advertising range of the second routing information comprises an identifier of an external neighbor of the apparatus; and
controlling the advertising of the second routing information according to the advertising range of the second routing information.

10. The apparatus according to claim 9, wherein the instructions, when executed by the processor, further cause the apparatus to perform:
advertising the second routing information to the external neighbor of the apparatus corresponding to the advertising range of the second routing information.

11. A method comprising:
receiving, by a control device, first routing information, wherein the first routing information comprises an identifier of a first forwarding device;
determining, by the control device, a first routing path according to the identifier of the first forwarding device and an identifier of a second forwarding device; and
determining, by the control device, an advertising range of second routing information for the second forwarding device according to the first routing path;
sending, by the control device, the second routing information to the second forwarding device;
wherein the second routing information is generated according to the first routing information, the second forwarding device receives of the second routing information, and the advertising range of the second routing information comprises an identifier of an external neighbor of the second forwarding device and the advertising range of the second routing information is used to enable the second forwarding device to advertise the second routing information according to the advertising range of the second routing information.

12. The method according to claim 11, wherein
the advertising range of the second routing information for the second forwarding device comprises the identifier of the external neighbor of the second forwarding device.

13. The method according to claim 12, wherein the first routing path comprises the identifier of the first forwarding device and the identifier of the second forwarding device.

14. The method according to claim 13, wherein the first routing path comprises a shortest path, wherein the shortest path between the identifier of the first forwarding device and the identifier of the second forwarding device is obtained according to path length constraint.

15. The method according to claim 13, wherein the first routing path comprises a highest bandwidth path, wherein the highest bandwidth path between the identifier of the first forwarding device and the identifier of the second forwarding device is obtained according to bandwidth constraint.

16. The method according to claim 11, wherein before determining the first routing path according to the identifier of the first forwarding device and the identifier of the second forwarding device, the method further comprises:
obtaining, by the control device, an internal network topology and an external network topology for the second forwarding device within a preset range; and
generating, by the control device, a whole network topology for the second forwarding device according to the internal network topology and the external network topology for the second forwarding device.

17. The method according to claim 16, wherein obtaining the external network topology for the second forwarding device within the preset range, comprises:
receiving, by the control device, the external network topology for the second forwarding device from the second forwarding device.

18. The method according to claim 16, wherein obtaining the external network topology for the second forwarding device within the preset range, comprises:
obtaining, by the control device, the external network topology for the second forwarding device through one of: a graphic user interface (GUI) or a command line by receiving user input.

* * * * *